United States Patent
Fujinoki et al.

(10) Patent No.: US 8,885,451 B2
(45) Date of Patent: Nov. 11, 2014

(54) RECORDING MEDIUM, OPTICAL INFORMATION DEVICE AND METHOD FOR PRODUCING RECORDING MEDIUM

(75) Inventors: Norihito Fujinoki, Kyoto (JP); Shigeru Furumiya, Kyoto (JP); Teruhiro Shiono, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/129,697

(22) PCT Filed: Jul. 26, 2012

(86) PCT No.: PCT/JP2012/004763
§ 371 (c)(1),
(2), (4) Date: Dec. 27, 2013

(87) PCT Pub. No.: WO2013/014935
PCT Pub. Date: Jan. 31, 2013

(65) Prior Publication Data
US 2014/0133285 A1    May 15, 2014

(30) Foreign Application Priority Data
Jul. 27, 2011    (JP) ................... 2011-163980

(51) Int. Cl.
| G11B 7/24 | (2013.01) |
| G11B 3/70 | (2006.01) |
| G11B 7/00 | (2006.01) |
| G11B 7/24027 | (2013.01) |
| G11B 7/241 | (2006.01) |
| G11B 7/243 | (2013.01) |

(52) U.S. Cl.
CPC ............ *G11B 7/24027* (2013.01); *G11B 7/241* (2013.01); *G11B 2007/24312* (2013.01); *G11B 2007/24314* (2013.01); *G11B 2007/24316* (2013.01)

USPC .......................... 369/275.1; 369/288; 369/100

(58) Field of Classification Search
None
See application file for complete search history.

(56) References Cited

U.S. PATENT DOCUMENTS

| 8,169,879 B2 * | 5/2012 | Kamiguchi et al. ..... 369/112.24 |
| 2010/0124160 A1 | 5/2010 | Kamiguchi et al. |
| 2012/0020199 A1 | 1/2012 | Hisada et al. |
| 2012/0113772 A1 | 5/2012 | Shiono et al. |

FOREIGN PATENT DOCUMENTS

| JP | 2007-207395 | 8/2007 |
| JP | 2007-272996 | 10/2007 |
| JP | 2010-123193 | 6/2010 |
| JP | 2010-165438 | 7/2010 |
| WO | 2010/116707 | 10/2010 |
| WO | 2011/010447 | 1/2011 |

OTHER PUBLICATIONS

International Search Report issued Oct. 2, 2012 in International (PCT) Application No. PCT/JP2012/004763.

(Continued)

*Primary Examiner* — Thang Tran
(74) *Attorney, Agent, or Firm* — Wenderoth, Lind & Ponack, L.L.P.

(57) ABSTRACT

A recording medium (10) is provided with a left-handed material layer (1) having at least one of a permittivity and a permeability of a negative value, and having substantially periodically formed structures; and a recording layer (2) including island-shaped and substantially periodically arranged recording regions (22), and being laminated on the left-handed material layer (1). The structure period of the left-handed material layer (1) is equal to or is an integral multiple of the arrangement period of the recording regions (22) of the recording layer (2).

10 Claims, 7 Drawing Sheets

(56) References Cited

OTHER PUBLICATIONS

V. G. Veselago, "The Electrodynamics of Substances with Simultaneously Negative Values of ϵ and μ", Soviet Physics USPEKHI, vol. 10, No. 4, Jan.-Feb. 1968, pp. 509-514.

D. R. Smith et al., "Composite Medium with Simultaneously Negative Permeability and Permittivity", Physical Review Letters, vol. 84, No. 18, May 1, 2000, pp. 4184-4187.

Christopher L. Holloway et al., "A Double Negative (DNG) Composite Medium Composed of Magnetodielectric Spherical Particles Embedded in a Matrix", IEEE Transactions on Antennas and Propagation, vol. 51, No. 10, Oct. 2003, pp. 2596-2603.

Gunnar Dolling et al., "Low-loss negative-index metamaterial at telecommunication wavelengths", Optics Letters, vol. 31, No. 12, Jun. 15, 2006, pp. 1800-1802.

J. B. Pendry, "Negative Refraction Makes a Perfect Lens", Physical Review Letters, vol. 85, No. 18, Oct. 30, 2000, pp. 3966-3969.

* cited by examiner

RECORDING MEDIUM, OPTICAL INFORMATION DEVICE AND METHOD FOR PRODUCING RECORDING MEDIUM

TECHNICAL FIELD

The present invention relates to a recording medium capable of writing and reading information utilizing an optical method, and more particularly to a recording medium, an optical information device, and a method for producing the recording medium utilizing a left-handed material having a negative refractive index.

BACKGROUND ART

Nowadays, optical discs as represented by DVDs (Digital Versatile Discs) or BDs (Blu-ray Discs) are widely used as computer-readable recording media and video recording media, utilizing large capacity, random accessibility, portability, and storability, which are some of the features of the optical discs. In recent years, however, as an increase in information quantity accompanied by spread of the Internet, and an increase in information quantity accompanied by high vision TV broadcasting or personal video services have been carried out, there is a demand for a storage suitable for supplying or storing the contents of information. It is necessary to provide higher-density and larger-capacity optical discs than BDs, as data recording media.

A small light collecting spot is formed on an optical disc as represented by BD by a lens. Information is recorded on the optical disc, and information recorded on the optical disc is reproduced with use of laser light. The diameter of a light collecting spot is proportional to the wavelength λ of incident light, and is inversely proportional to the numerical aperture (hereinafter, called as NA) of an objective lens. It is necessary to shorten the wavelength of laser light and to increase the NA in order to further increase the recording density of an optical disc. However, the improvement on recording density has already reached a limit due to the diffraction limit of light.

In recent years, there are proposed optical recording media using near-field light in order to achieve high density beyond the diffraction limit of light. Near-field light is the light generated on the surface of a material when the material is irradiated with light, and is the light that exists only in a region in proximity to the material surface without propagation. The near-field light has a size substantially equal to the size of a small-size material. Accordingly, it is possible to utilize the light of a size not larger than the diffraction limit.

Further, in the case where recording marks are formed on a phase-change recording material, with use of a light spot of a size not larger than the diffraction limit, thermal diffusion occurs in the phase-change recording material heated by the light spot. This may make the size of the recording marks larger than the size of near-field light. Forming a pattern in advance on a recording medium makes it possible to stably perform recording and reproduction, while suppressing heat diffusion. It is possible to implement high-density and large-capacity optical recording media by recording smaller recording marks with use of these techniques (e.g. see patent literature 1).

However, the region where near-field light forms a light spot of a size not larger than the wavelength of light is a region away from the material surface by about several ten nm at most. The light intensity of near-field light exponentially attenuates, as the light is distanced from the material surface. In view of the above, in the case where information is recorded on a recording medium with use of near-field light, it is necessary to make the working distance (WD) between a recording head and a recording medium as small as possible to about several ten nm. As a result, a contact of the recording head with the recording medium may damage the recording head and the recording medium. Thus, the above technique may cause a problem relating to portability and reliability, which are some of the features of optical media.

Further, in recent years, left-handed materials have been drawing attention, as a material having unique optical features. Research and development on the left-handed materials have progressed. Application of the left-handed materials in a variety of fields has been expected.

The left-handed materials have artificial electromagnetic response characteristics such that at least one of a permittivity $\in$ and a permeability $\mu$ thereof has a negative value. A response between an electromagnetic wave including light and a material is described by way of the permittivity $\in$ and the permeability $\mu$. Both of the permittivity $\in$ and the permeability $\mu$ of a transparent material existing in the nature have positive values, and the refractive index $n=(\in\mu)^{1/2}$ thereof is a real number.

In the case where the permittivity $\in$ and the permeability $\mu$ of a material simultaneously have negative values, an electromagnetic wave propagates through the material, because the refractive index n of the material is a real number. The materials, in which the relationship between the electric field, the magnetic field, and the wave vector of the electromagnetic wave is a left-handed relationship, are called as left-handed materials (LHMs) or left-handed metamaterials, or simply called as metamaterials. On the other hand, the materials, in which the relationship between the electric field, the magnetic field, and the wave vector of the electromagnetic wave is a right-handed relationship, are called as right-handed materials.

It is reported that the left-handed materials exhibit novel electromagnetic phenomena such as a negative refractive index and a near-field light propagation effect. It is expected that a novel optical element capable of collecting near-field light can be implemented with use of the left-handed materials (see e.g. non-patent literature 1).

Such a left-handed material has microstructures configured such that fragments of a material each having a size smaller than the wavelength of an electromagnetic wave (light wave) to be used are periodically or non-periodically arranged as unit elements. It is impossible to resolute the unit elements by the electromagnetic wave of a wavelength sufficiently larger than the average gap between the unit elements. Accordingly, the left-handed materials behave like a homogeneous material. The electrical properties and the magnetic properties of the left-handed materials are determined by the material quality, the shape, or the pattern of unit elements constituting the left-handed materials. Generally, it is desired to set the size of a microstructure equal to or smaller than about one-tenth of the wavelength of light (see e.g. non-patent literature 2 and non-patent literature 3).

One of the left-handed materials is a left-handed material having a fishnet structure (see e.g. non-patent literature 4). The left-handed material having a fishnet structure has a structure such that net-shaped metal parts and dielectric parts are alternately laminated one over the other. The left-handed material having a fishnet structure is such that a negative permittivity is implemented by plasmon resonance of metal parts extending in the direction of electric field of the electromagnetic wave (light wave) to be used, and that a negative permeability is implemented by metal parts opposing each other and extending in the direction of magnetic field. It is reported that the left-handed material having a fishnet structure can implement a negative refractive index in a light wavelength region.

Further, the left-handed materials have an effect of amplifying near-field light. It is reported that a flat plate made of a left-handed material is formed into a lens having a resolution over the diffraction limit defined by the wavelength of light (see e.g. non-patent literature 5). As described above, use of a lens made of a left-handed material makes it possible to collect light on a small spot, without considering the diffraction limit of light.

There have been proposed a recording medium and a recording system using such a left-handed material as a material for a lens (see e.g. patent literature 2). A lens made of a left-handed material is disposed near a light source or above a recording medium. With use of an effect of amplifying a near-field light component by the left-handed material, it is possible to collect near-field light, which is normally formed only in a region in proximity to a light source, at a position sufficiently away from the light source or from a lens made of the left-handed material. In the above configuration, assuming that the refractive index n of the left-handed material is $-1.0$, a geometrical imaging condition required by a lens made of the left-handed material satisfies a relationship: d=WD, where d denotes the thickness of the lens made of the left-handed material, and WD denotes the distance between the light exit surface of the lens made of the left-handed material and the light incident surface of the recording medium. Accordingly, increasing the thickness d of the lens made of the left-handed material makes it possible to increase the distance WD. The above configuration contributes to improvement of reliability, which is one of the features of optical media.

However, the left-handed material has anisotropy as well as crystal. In the case of crystal, anisotropy is defined with respect to the direction of crystal axis. In the case of a left-handed material, however, the constant of the left-handed material differs also depending on the electromagnetic wave propagation direction. Accordingly, the light collecting characteristics of a small-size light source incorporated with a lens made of a left-handed material are non-uniform depending on the configuration, the surface area, and the light irradiation position of a microstructure which acts on light, and depending on the electromagnetic wave propagation direction.

In view of the above, in the case where information is recorded on a recording layer having substantially periodically arranged recording regions, with use of the effect of propagation of light including near-field light and the light collecting effect by a left-handed material having substantially periodically formed structures, if the arrangement period of the recording regions and the structure period of the left-handed material do not coincide with each other, recording characteristics and reproduction characteristics may vary.

CITATION LIST

Patent Literature

Patent literature 1: International Unexamined Patent Publication No. 2010/116707
Patent literature 2: Japanese Unexamined Patent Publication No. 2007-207395

Non-Patent Literature

Non-Patent Literature 1:
V. G. Veselago, "THE ELECTRODYNAMICS OF SUBSTANCES WITH SIMULTANEOUSLY NEGATIVE VALUES OF $\in$ AND $\mu$", Soviet Physics USPEKHI, 10, 509-514 (1968)
Non-Patent Literature 2:
D. R. Smith et al., "Composite Medium with Simultaneously Negative Permeability and Permittivity", Phys. Rev. Lett., 84, 4184 (2000)
Non-Patent Literature 3:
C. L. Holloway et al., "A Double Negative (DNG) Composite Medium Composed of Magnetodielectric Spherical Particles Embedded in a Matrix", IEEE Trans. Antennas Propag. 51, 2596 (2003)
Non-Patent Literature 4:
G. Dolling et al., "Low-loss negative-index metamaterial at telecommunication wavelengths", Opt Lett, 31, 1800 (2006)
Non-Patent Literature 5:
J. B. Pendry, "Negative Refraction Makes a Perfect Lens", Phys, Rev, Lett., 85, 3966-3969 (2000)

SUMMARY OF INVENTION

In view of the above, an object of the invention is to provide a recording medium, an optical information device, and a method for producing the recording medium that enable to implement stable information recording or reproduction.

An optical recording medium according to an aspect of the invention is provided with a left-handed material layer having at least one of a permittivity and a permeability of a negative value, and having substantially periodically formed structures; and a recording layer including island-shaped and substantially periodically arranged recording regions, and being laminated on the left-handed material layer, wherein the structure period of the left-handed material layer is equal to or is an integral multiple of the arrangement period of the recording regions of the recording layer.

According to the above configuration, the left-handed material layer has at least one of a permittivity and a permeability of a negative value, and has substantially periodically formed structures. The recording layer includes island-shaped and substantially periodically arranged recording regions, and is laminated on the left-handed material layer. The structure period of the left-handed material layer is equal to or is an integral multiple of the arrangement period of the recording regions of the recording layer.

According to the invention, the structure period of the left-handed material layer is equal to or is an integral multiple of the arrangement period of the recording regions of the recording layer. Accordingly, it is possible to make the recording intensity uniform, and to implement stable information recording or reproduction, while suppressing variation of reflected light in a recording state.

These and other objects, features and advantages of the present invention will become more apparent upon reading the following detailed description along with the accompanying drawings.

DESCRIPTION OF EMBODIMENTS

In the following, embodiments of the invention are described referring to the accompanying drawings. The following embodiments are merely examples embodying the invention, and do not limit the technical range of the invention.

First Embodiment

Figure 1:
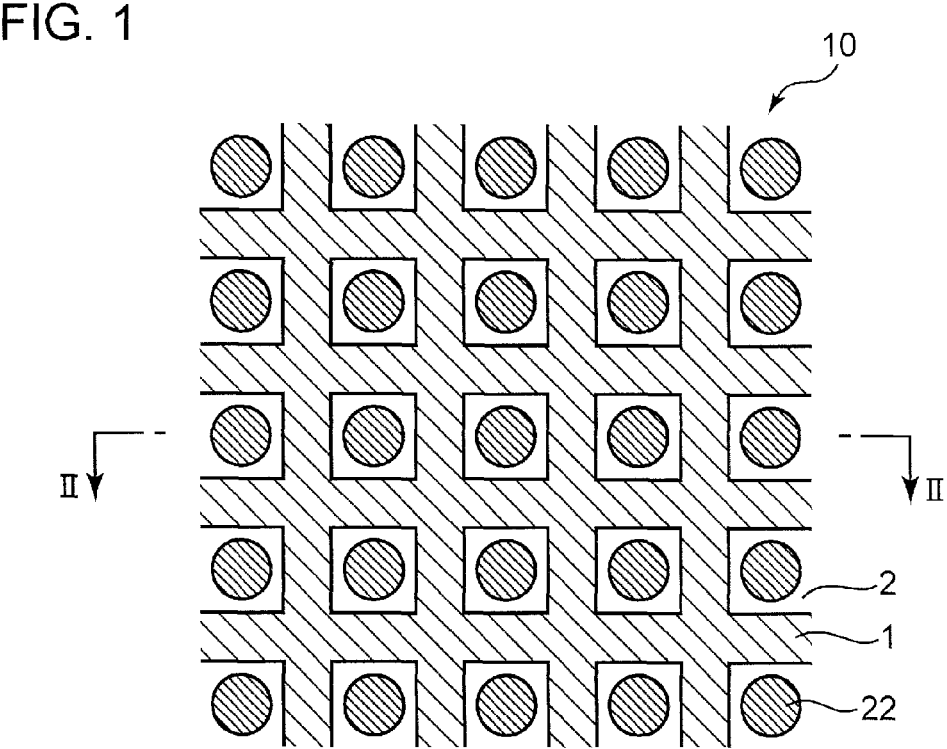
FIG. 1 is a top plan view showing a configuration of a recording medium according to a first embodiment of the invention.
Figure 2:
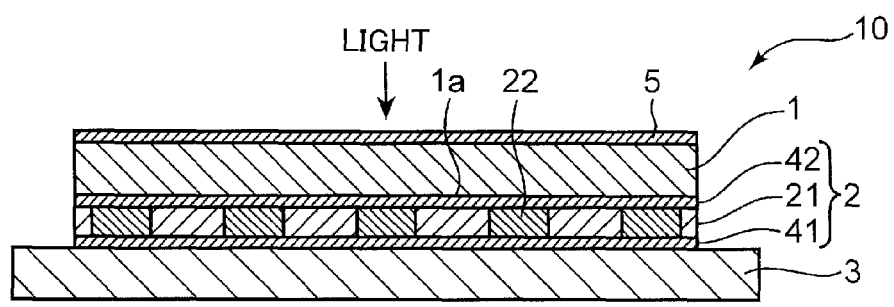
FIG. 2 is a cross-sectional view taken along the line II-II of the recording medium shown in FIG. 1.

In the following, a configuration example of a recording medium according to the first embodiment of the invention is described. FIG. 1 is a top plan view showing a configuration of the recording medium according to the first embodiment of the invention. Further, FIG. 2 is a cross-sectional view taken along the line II-II of the recording medium shown in FIG. 1. As shown in FIG. 1 and FIG. 2, a recording medium 10 is provided with a substrate 3 made of a glass material, a recording layer 2 formed on the substrate 3, a left-handed material layer 1 formed on the recording layer 2, and a protection layer 5 formed on the left-handed material layer 1.

As will be described later, the recording medium 10 may have a protection layer for protecting the recording layer 2 between the recording layer 2 and the left-handed material layer 1.

The left-handed material layer 1 has at least one of a permittivity and a permeability of a negative value, and has substantially periodically formed structures. More preferably, the left-handed material layer 1 has both of a permittivity and a permeability of negative values. The left-handed material layer 1 is formed on the light irradiation side of the recording layer 2.

The recording layer 2 includes island-shaped and substantially periodically arranged recording regions 22, and is laminated on the left-handed material layer 1. The structure period of the left-handed material layer 1 is equal to or is an integral multiple of the arrangement period of the recording regions 22 of the recording layer 2. Preferably, the structure period of the left-handed material layer 1 is equal to n times (where n is a positive integer of 2 or larger) of the arrangement period of the recording regions 22 of the recording layer 2. The recording regions 22 are made of particles, for instance.

The recording layer 2 is provided with a phase-change recording layer 21, a first interface layer 41, and a second interface layer 42. The first interface layer 41 is formed between the substrate 3 and the phase-change recording layer 21. The second interface layer 42 is formed between the phase-change recording layer 21 and the left-handed material layer 1. In the first embodiment, the recording layer 2 is provided with the first interface layer 41 and the second interface layer 42. The invention is not specifically limited to the above. The recording layer 2 may be provided only with the first interface layer 41. Further, the recording layer 2 may be provided only with the second interface layer 42. Further, the recording layer 2 may be devoid of the first interface layer 41 and the second interface layer 42.

The first interface layer 41 and the second interface layer 42 are made of a material containing at least one of Si, Zr, Cr, and N, and are formed on the upper surface and the lower surface of the phase-change recording layer 21, respectively.

The substrate 3 has a disc-like shape. A preferred example of the material composing the substrate 3 is a material having a high flatness and having a high stability in rotating a recording medium for recording and reproduction. In this embodiment, a glass material having a high flatness is used as the material composing the substrate 3. The material for the substrate 3 is not limited to the above. It is possible to use a metal such as aluminum, or a plastic material such as polycarbonate.

The recording regions 22 are formed in advance in the form of islands on the phase-change recording layer 21, which is formed on the substrate 3. The recording regions 22 are substantially periodically arranged and formed. In this embodiment, the pattern of the recording regions 22 is formed in advance on the phase-change recording layer 21. The method for forming the recording regions 22 is not limited to the above. It is possible to form recording regions 22 on a phase-change recording layer 21 in such a manner that the arrangement period of the recording regions 22 is equal to or is an integral multiple of the structure period of a left-handed material layer 1, after the left-handed material layer 1 is laminated on the phase-change recording layer 21 devoid of the recording regions 22.

The phase-change recording layer 21 is made of a phase-change material containing at least one of Ge, Sb, and Te. Preferred examples of the phase-change material are GeSb and GeSbTe.

In this embodiment, the phase-change recording layer 21 is made of a phase-change material. The material for the phase-change recording layer 21 is not limited to the above. It is possible to use a recording material capable of recording information by partially changing at least one of a reflectance, a refractive index, light polarization characteristics, light emission characteristics, a crystalline state, a molecular state, a magnetized state, a charge state, and a ferroelectric polarization state. For instance, the phase-change recording layer 21 may be made of a two-photon absorbing material or a magnetic material.

Further, in this embodiment, the left-handed material layer 1 is made of a left-handed material having a fishnet structure. The left-handed material having a fishnet structure has a structure such that metal parts and dielectric parts are laminated in the form of a net, or metal parts are laminated in the form of a net. Examples of the metal are silver, gold, and copper; and an alloy containing at least two of the metals: silver, gold, and copper. Examples of the dielectric material are $MgF_2$, $Al_2O_3$, $TiO_2$, $ZnO_2$, $Si_3N_4$, $SiO_2$, CaO, and MgO. Further, air or a dielectric material is filled in the clearance of the material having a fishnet structure.

Further, in this embodiment, the left-handed material layer 1 is made of a left-handed material having a fishnet structure. The material for the left-handed material layer 1 is not limited to the above. The left-handed material layer 1 may be made of a material configured such that structures are substantially periodically arranged, as represented by nano-wire structures, split-rings, particles, rods, particle rods, holes, and chiralities; or may be made of a material having at least one of a permittivity and a permeability of a negative value.

Further, the left-handed material layer 1 may be made of a left-handed material configured such that particles composed of a metal material, a semiconductor material, or a dielectric material are dispersed in a dielectric matrix. Examples of the dielectric matrix are oxides such as $MgF_2$, $Al_2O_3$, $TiO_2$, $ZnO_2$, $Si_3N_4$, $SiO_2$, CaO, and MgO; and plastic materials such as epoxy resins, phenol resins, polycarbonate resins, polyethylene, and UV curable resins.

Further, the left-handed material layer 1 may be made of photonic crystal or graphene, which are known as materials having a negative refractive index. In the above modification, at least one of a permittivity and a permeability of the material constituting the structures may have a negative value, or at least one of the effective permittivity and the effective permeability of the structures may have a negative value.

The left-handed material layer 1 of the embodiment has a principal plane 1a to be contacted with the recording layer 2. The left-handed material layer 1 has a negative permittivity at least in one of the direction of light to be perpendicularly incident on the principal plane 1a of the left-handed material layer 1, and the direction of light to be obliquely incident on the principal plane 1a.

Further, preferably, the left-handed material layer 1 of the embodiment has a negative refractive index at least in one of the direction of light to be perpendicularly incident on the principal plane 1a of the left-handed material layer 1, and the direction of light to be obliquely incident on the principal plane 1a.

Further, in the case where evanescent wave or near-field light is used as recording light, preferably, the thickness of the left-handed material layer 1 is in the range of from 20 nm to 200 nm, taking into consideration of optical loss by the left-handed material layer 1.

Figure 3:
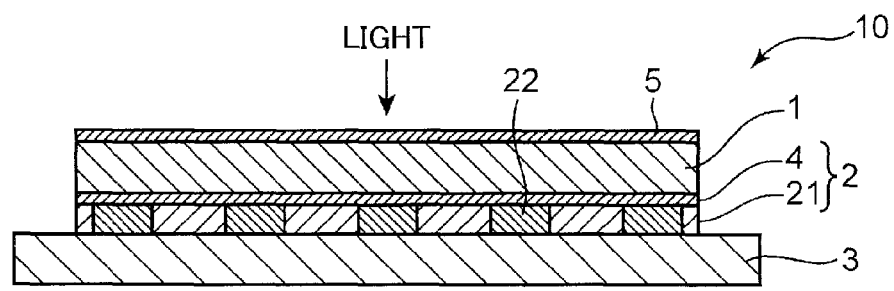
FIG. 3 is a cross-sectional view showing a configuration of a recording medium as a first modification of the first embodiment.

FIG. 3 is a cross-sectional view showing a configuration of a recording medium as a first modification of the first embodiment.

As shown in FIG. 3, a recording layer 2 may be provided with an interface layer 4 only on the upper portion of a phase-change recording layer 21. Further, although not illustrated, a recording layer 2 may be provided with an interface layer 4 only on the lower portion of a phase-change recording layer 21. Further, an interface layer 4 may be formed on the upper portion of a left-handed material layer 1.

Further, as shown in FIG. 2, the recording layer 2 may be provided with the first interface layer 41 and the second interface layer 42 on the lower portion and the upper portion of the phase-change recording layer 21, respectively; or the phase-change recording layer 21 may be formed between the first interface layer 41 and the second interface layer 42. Protecting the phase-change recording layer 21 by the first interface layer 41 and the second interface layer 42 as described above is advantageous in stably recording information on the phase-change recording layer 21.

It is desirable to use a dielectric material as the material for the first interface layer 41 and the second interface layer 42. Examples of the dielectric material are oxides of one or more kinds selected from the group of $TiO_2$, $ZrO_2$, $HfO_2$, ZnO, $Nb_2O_5$, $Ta_2O_5$, $SiO_2$, $SnO_2$, $Al_2O_3$, $Bi_2O_3$, $Cr_2O_3$, $Ga_2O_3$, $In_2O_3$, $Sc_2O_3$, $Y_2O_3$, $La_2O_3$, $Gd_2O_3$, $Dy_2O_3$, $Yb_2O_3$, CaO, MgO, $CeO_2$, and $TeO_2$.

Examples of the material for the first interface layer 41 and the second interface layer 42 are preferably oxides such as SiO, $SiO_2$, ZnO, $SnO_2$, $Al_2O_3$, $TiO_2$, $In_2O_3$, MgO, and $ZrO_2$; nitrides such as $Si_3N_4$, AlN, TiN, BN, and ZrN; sulfides such as ZnS, $In_2S_3$, and $TaS_4$; carbides such as SiC, TaC, $B_4C$, WC, TiC, and ZrC; diamond-like carbon; and preferably, mixtures thereof. The first interface layer 41 and the second interface layer 42 are formed by sputtering, ion plating, vacuum deposition, plasma CVD (Chemical Vapor Deposition), or a like process.

Further, examples of the material for the first interface layer 41 and the second interface layer 42 may be sulfides such as ZnS, carbides such as SiC, fluorides such as $LaF_3$, $CeF_3$, and $MgF_2$, and carbon (C). Further, the material for the first interface layer 41 and the second interface layer 42 may be a material of one kind selected from the aforementioned materials, or may be a mixture of materials of two or more kinds selected from the aforementioned materials.

Figure 4:
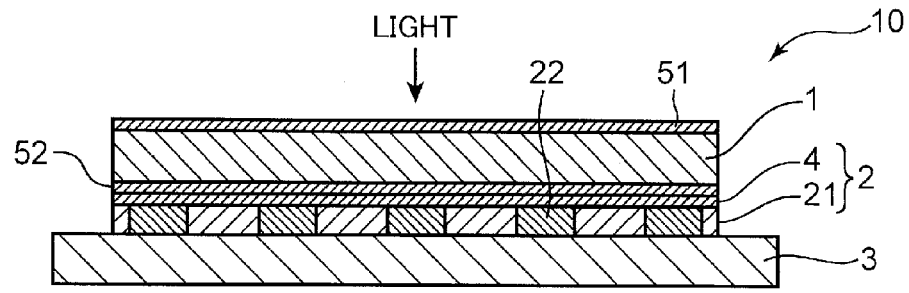
FIG. 4 is a cross-sectional view showing a configuration of a recording medium as a second modification of the first embodiment.

FIG. 4 is a cross-sectional view showing a configuration of a recording medium as a second modification of the first embodiment.

As shown in FIG. 2, the recording medium 10 may be provided with the protection layer 5 only on the upper portion of the left-handed material layer 1. Alternatively, as shown in FIG. 4, a recording medium 10 may be provided with a first protection layer 51 and a second protection layer 52 on the upper portion and the lower portion of a left-handed material layer 1, respectively.

Examples of the protection layer 5, the first protection layer 51, and the second protection layer 52 are preferably oxides such as SiO, $SiO_2$, ZnO, $SnO_2$, $Al_2O_3$, $TiO_2$, $In_2O_3$, MgO, and $ZrO_2$; nitrides such as $Si_3N_4$, AlN, TiN, BN, and ZrN; sulfides such as ZnS, $In_2S_3$ and $TaS_4$; carbides such as SiC, TaC, $B_4C$, WC, TiC, and ZrC; diamond-like carbon; and preferably mixtures thereof.

In the case where evanescent wave or near-field light is used as recording light, the thickness of the protection layer 5 formed on the upper portion of the left-handed material layer 1 is preferably not larger than 150 nm.

The structure period of the left-handed material layer 1 having a fishnet structure, which is formed on the upper portion of the recording layer 2, is equal to or is an integral multiple of the arrangement period of the recording regions 22 of the recording layer 2. In this embodiment, the arrangement period of the recording regions 22 of the recording layer 2 is a two-dimensional period constituted of the arrangement period of the recording regions 22 in the recording direction, and the arrangement period of the recording regions 22 in a direction perpendicular to the recording direction. In this example, the recording direction coincides with the tracking direction for recording information on a recording medium.

Figure 5:
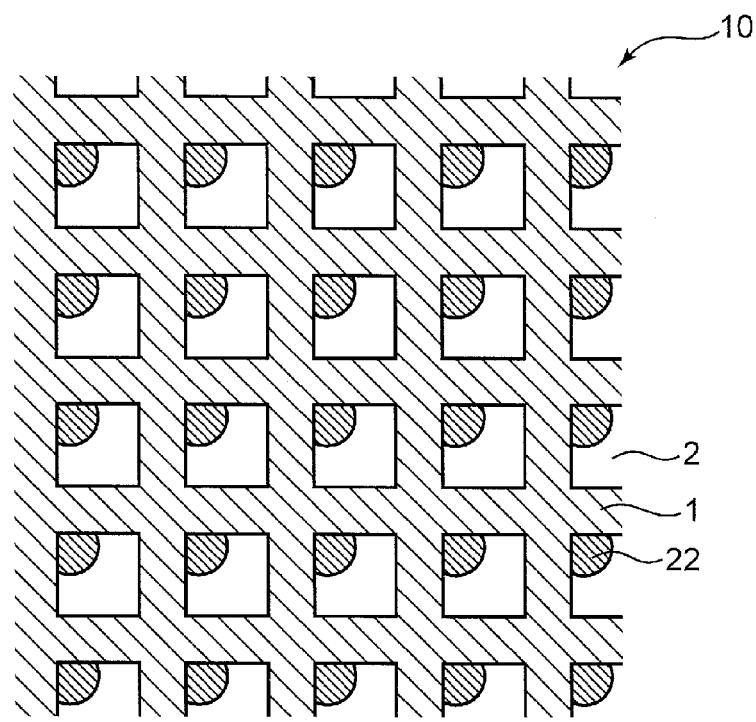
FIG. 5 is a top plan view showing a configuration of a recording medium as a third modification of the first embodiment.

As shown in FIG. 1, the structure period of the left-handed material layer 1 and the arrangement period of the recording regions 22 of the recording layer 2 are arranged to coincide with each other. In this embodiment, the center of each respective opening of the left-handed material layer 1 having a fishnet structure, and the center of each respective recording region 22 are arranged to coincide with each other. However, the configuration is not limited to the above. FIG. 5 is a top plan view showing a configuration of a recording medium as a third modification of the first embodiment. As shown in FIG. 5, the center of each respective opening of the left-handed material layer 1 having a fishnet structure, and the center of each respective recording region 22 may not coincide with each other, as far as the structure period of the left-handed material layer 1 and the arrangement period of the recording regions 22 of the recording layer 2 coincide with each other.

The left-handed material layer 1 of the embodiment is made of a left-handed material having a fishnet structure. However, the configuration is not limited to the above. The left-handed material layer 1 may be made of a left-handed material configured such that structures are substantially periodically arranged, as represented by nano-wire structures, split-rings, particles, rods, particle rods, holes, or chiralities. Further, the left-handed material layer 1 may be made of a left-handed material configured such that particles composed of a metal material, a semiconductor material, or a dielectric material are dispersed in a dielectric matrix; or may be made of photonic crystal, as far as the structure period of the left-handed material layer 1 and the arrangement period of the recording regions 22 of the recording layer 2 are arranged to coincide with each other.

Further, the recording medium may be provided with plural left-handed material layers and plural recording layers.

Figure 6:
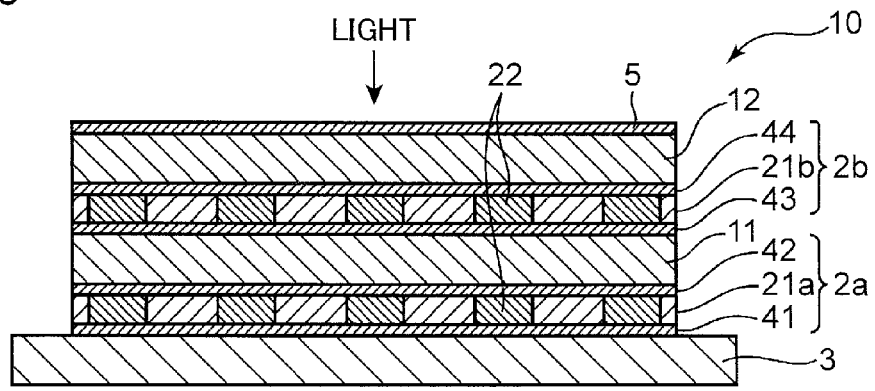
FIG. 6 is a cross-sectional view showing a configuration of a recording medium as a fourth modification of the first embodiment.

FIG. 6 is a cross-sectional view showing a configuration of a recording medium as a fourth modification of the first embodiment.

As shown in FIG. 6, a recording medium 10 may be provided with a substrate 3, a first recording layer 2a, a first left-handed material layer 11, a second recording layer 2b, a second left-handed material layer 12, and a protection layer 5.

The first recording layer 2a is formed on the substrate 3. The first recording layer 2a is provided with a first phase-change recording layer 21a, a first interface layer 41, and a second interface layer 42. The first left-handed material layer 11 is formed on the first recording layer 2a. The second recording layer 2b is formed on the first left-handed material layer 11. The second recording layer 2b is provided with a second phase-change recording layer 21b, a third interface layer 43, and a fourth interface layer 44. The second left-handed material layer 12 is formed on the second recording layer 2b. The protection layer 5 is formed on the second left-handed material layer 12.

As shown in FIG. 6, the first and second left-handed material layers 11 and 12, and the first and second recording layers 2a and 2b may be alternately laminated. In the recording medium having the above configuration, preferably, the structure period of the first left-handed material layer 11 and the arrangement period of the recording regions 22 of the first recording layer 2a coincide with each other, and the structure period of the second left-handed material layer 12 and the arrangement period of the recording regions 22 of the second recording layer 2b coincide with each other. However, it is not always necessary to coincide these periods with each other.

Second Embodiment

In the following, there are described a recording method for recording information on the aforementioned recording medium, and a reproducing method for reproducing information from the aforementioned recording medium in the second embodiment.

Figure 7:
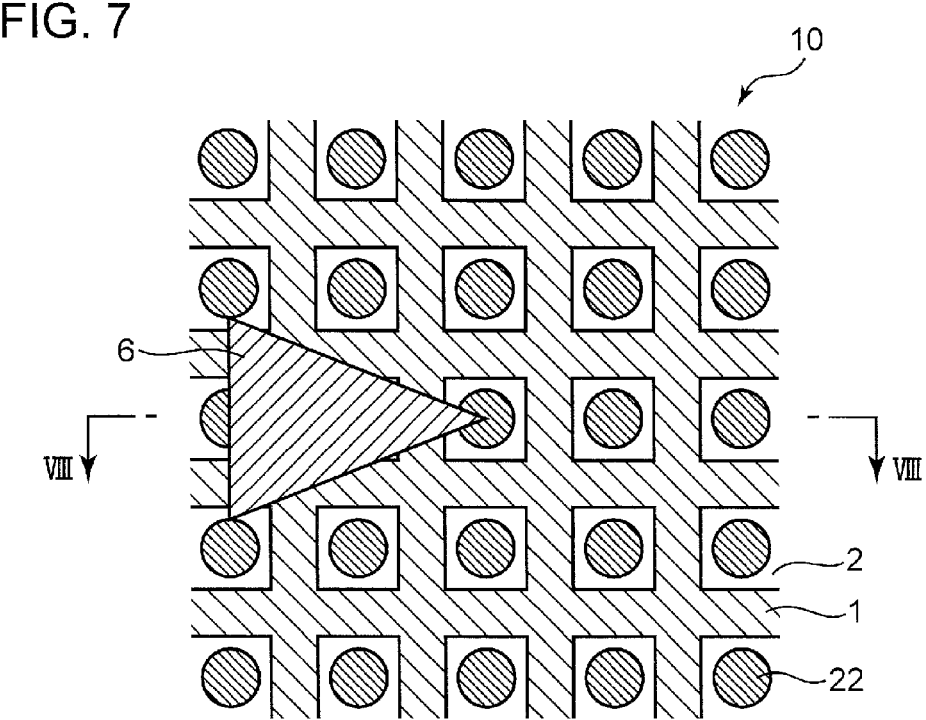
FIG. 7 is a top plan view showing configurations of a recording medium and an antenna according to a second embodiment of the invention.
Figure 8:
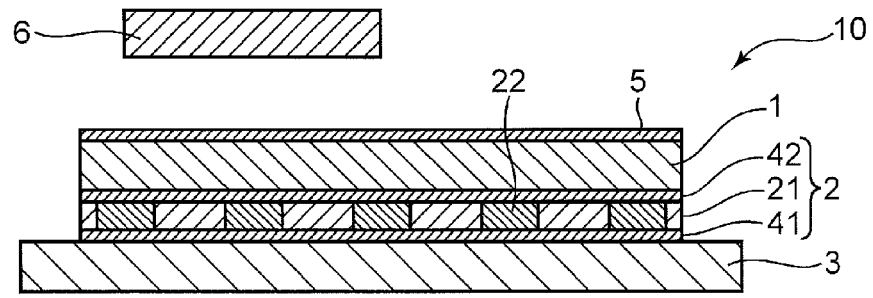
FIG. 8 is a cross-sectional view taken along the line VIII-VIII of the recording medium and the antenna shown in FIG. 7.
Figure 9:
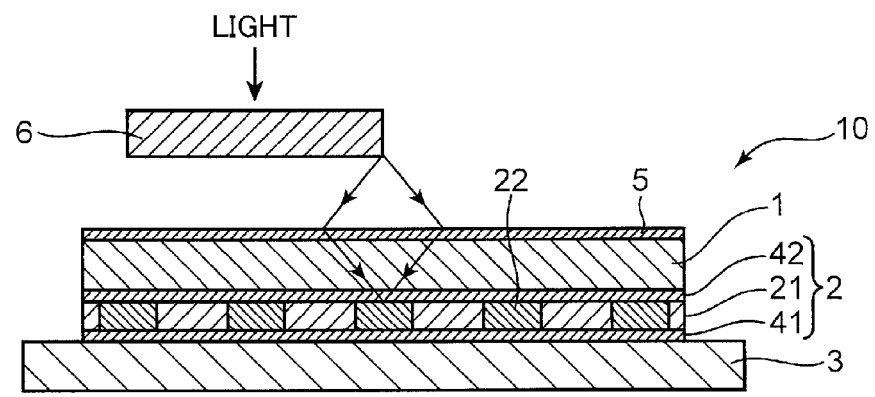
FIG. 9 is a diagram showing an optical path of light to be incident on the recording medium in the second embodiment of the invention.

FIG. 7 to FIG. 9 are diagrams for describing an example of a recording method for recording information on the recording medium. FIG. 7 is a top plan view showing configurations of the recording medium and an antenna in the second embodiment of the invention. Further, FIG. 8 is a cross-sectional view taken along the line VIII-VIII of the recording medium and the antenna shown in FIG. 7. Further, FIG. 9 is a diagram showing an optical path of light to be incident on the recording medium according to the second embodiment of the invention.

As shown in FIG. 7 to FIG. 9, light having a polarization direction is irradiated onto an antenna 6 made of Au. Upon irradiation of light, strong near-field light is generated on the apex of the antenna 6 disposed in the polarization direction by plasmon enhancement effect. The light intensity of near-field light exponentially attenuates, as the light is distanced from the tip of the antenna 6. Upon incidence of near-field light whose light intensity is attenuated as described above onto the left-handed material layer 1, the light intensity of near-field light is amplified within the left-handed material layer 1. The amplified near-field light is collected, and the collected light is focused on the phase-change recording layer 21.

Upon irradiation of light onto a recording region (a phase-change particle) 22 within the phase-change recording layer 21, the temperature of the recording region 22 increases, and information is recorded in the recording region 22. Specifically, the recording region 22 is amorphousized by being heated to a temperature of not lower than the melting point, followed by rapid cooling. On the other hand, the recording region 22 is crystallized by being heated to a temperature of not lower than the melting point, followed by gradual cooling. Further, the recording region 22 is crystallized by being heated to a temperature of not higher than the melting point but not lower than the crystallization temperature, and then by keeping the temperature for a time period not shorter than a time period required for crystallization. In this example, the crystallization temperature is a lowest temperature required for crystallizing a phase-change material. As described above, information is recorded by utilizing that the recording region 22 has optical characteristics different from each other between an amorphous state and a crystalline state.

In this embodiment, Au is used as the material for the antenna 6. The material for the antenna 6 is not limited to the above. It is preferable to select a material capable of obtaining plasmon resonance according to the wavelength of laser light to be used. Examples of the material for the antenna 6 are metals such as Ag, Cu, Ni, W, Al, Ti, Pt, Pd, Ni, Be, Mo, and Cr; and compounds containing a metal, and Pd, Si or Cu.

In this embodiment, near-field light generated from the antenna 6 is used. However, the configuration is not limited to the above. It is possible to use laser light collected by a lens, to use near-field light generated through a small-size opening, whose size is smaller than the wavelength of light generated from a tip of an optical fiber probe, or to use near-field light generated from a tip of a metal probe.

In this example, let us compare between a case, in which the structure period of the left-handed material layer 1 having substantially periodically formed structures, and the arrangement period of the recording layer 2 including the substantially periodically arranged recording regions 22 coincide with each other, and a case, in which the structure period of the left-handed material layer 2 having substantially periodically formed structures, and the arrangement period of the recording layer 2 including the substantially periodically arranged recording regions 22 do not coincide with each other. In the case where the structure period of the left-handed material layer 1 and the arrangement period of the recording regions 22 of the recording layer 2 coincide with each other, the recording intensity is uniform, and it is possible to record information in a satisfactory manner. On the other hand, in the case where the structure period of the left-handed material layer 1 and the arrangement period of the recording regions 22 of the recording layer 2 do not coincide with each other, the recording intensity is non-uniform, and regions having recorded information may be non-uniform such that information has been recorded in some regions and information has not been recorded in other regions.

Further, in the case where information is read by detecting reflected light from the recording layer 2 on which information has been recorded, it is possible to maximally suppress variation of reflected light in a recording state, as far as the structure period of the left-handed material layer 1 and the arrangement period of the recording regions 22 of the recording layer 2 coincide with each other. On the other hand, in the case where the structure period of the left-handed material layer 1 and the arrangement period of the recording regions 22 of the recording layer 2 do not coincide with each other, variation of reflected light in a recording state may increase, which may make it impossible to reproduce information in a satisfactory manner.

Third Embodiment

In the following, there is described a method for improving recording characteristics and reproducing characteristics of the aforementioned recording medium in the third embodiment.

Figure 10:
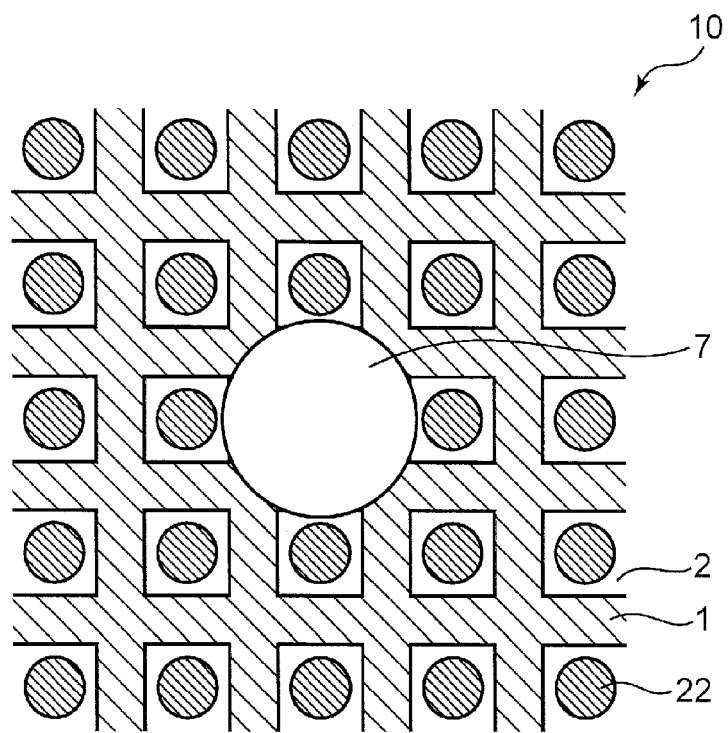
FIG. 10 is a diagram for describing a positional relationship between a recording medium provided with a left-handed material layer using a left-handed material having a fishnet structure, and a light spot in the case where near-field light is used as recording light.

FIG. 10 is a diagram for describing a positional relationship between a recording medium provided with a left-handed material layer using a left-handed material having a fishnet structure, and a light spot in the case where near-field light is used as recording light.

The light collecting characteristics of small-size light using a left-handed material layer 1 are non-uniform depending on the configuration, the surface area, the light irradiation position of microstructures on which light acts, and depending on the electromagnetic wave propagation direction. A near-field light spot 7 of a size substantially equal to the structure period is irradiated onto the left-handed material layer 1 using a left-handed material having a fishnet structure in this embodiment. At the time of irradiation, as shown in FIG. 10, the optical loss is minimized by irradiating the near-field light spot 7 at a center of the fishnet structure constituted of unit structures as closed circuits. Accordingly, in the recording medium of this embodiment, the center of each respective closed circuit of the left-handed material layer 1 using a left-handed material having a fishnet structure, and the center of each respective recording region 22 of the recording layer 2 are made coincident with each other. Irradiating the near-field light spot 7 onto each respective closed circuit of the left-handed material layer 1 makes it possible to maximize the recording characteristics.

In this embodiment, the size of the near-field light spot 7 is equal to the structure period of the left-handed material layer 1. However, the configuration is not limited to the above. The size of the near-field light spot 7 may be set larger than the structure period of the left-handed material layer 1 depending on the light source for use in recording or reproduction.

Figure 11:
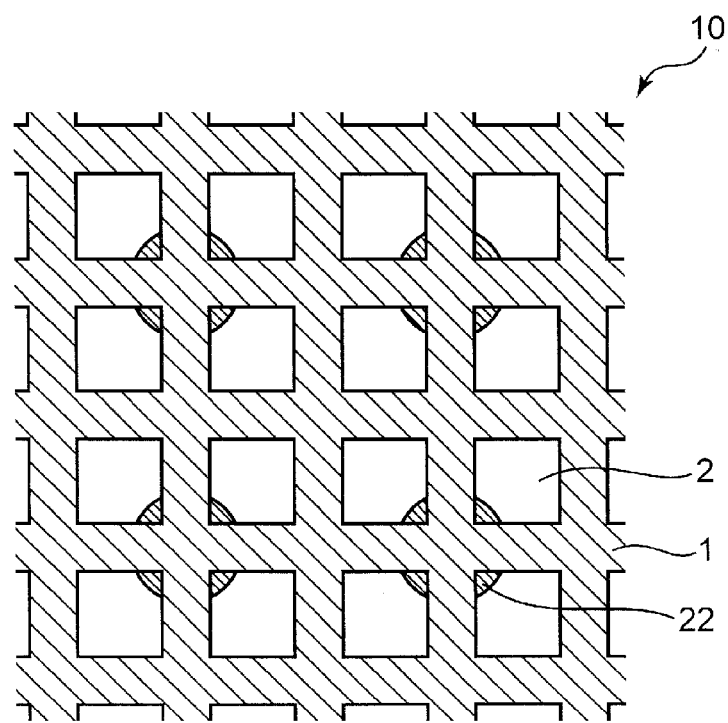
FIG. 11 is a top plan view showing a configuration of a recording medium as a modification of a third embodiment.

FIG. 11 is a top plan view showing a configuration of a recording medium as a modification of the third embodiment.

In this embodiment, the structure period of the left-handed material layer 1 and the arrangement period of the recording regions 22 of the recording layer 2 substantially coincide with each other. However, the configuration is not limited to the above. As shown in FIG. 11, the structure period of a left-handed material layer 1 may be an integral multiple of the arrangement period of recording regions 22 of a recording layer 2. In this modification, it is also possible to coincide the center of a fishnet structure of the left-hand material layer 1 constituted of unit structures as closed circuits, and the position of a recording region 22 of the recording layer 2 with each other. Further, it is also possible to coincide the positions of the left-handed material layer 1, and a recording region 22 of the recording layer 2 with each other.

Further, in this embodiment, the near-field light spot 7 of a size substantially equal to the structure period of the left-handed material layer 1 is used. However, the configuration is not limited to the above. The size of the near-field light spot 7 may be set larger than the structure period of the left-handed material layer 1. In the above modification, the arrangement period of the recording regions 22 of the recording layer 2 and the structure period of the left-handed material layer 1 are made coincident with each other, and the recording regions 22 are aligned and arranged at positions capable of minimizing the optical loss by the left-handed material layer 1 with respect to the diameter of the near-field light spot 7.

Further, in this embodiment, the optical loss is minimized by irradiating the near-field light spot 7 onto a center of a structure configured such that a finite structure of the left-handed material layer 1 serves as a closed circuit. However, the structure position of the left-handed material layer 1 which makes it possible to minimize the optical loss differs depending on the material composing the left-handed material layer 1. In view of the above, it is desirable to set the structure position of the left-handed material layer 1 which makes it possible to minimize the optical loss, as a recording position.

Further, in this embodiment, the left-handed material layer 1 is made of a left-handed material having a fishnet structure. However, the configuration is not limited to the above. The left-handed material layer 1 may be made of a material configured such that structures are substantially periodically arranged, as represented by nano-wire structures, split-rings, particles, rods, particle rods, holes, or chiralities; and at least one of the permittivity and the permeability of the material has a negative value. Further, it is preferable to set the light recording position in each of the structures, as a structure position at which the optical loss is minimized in each of the structures.

Further, the left-handed material layer 1 may be made of a left-handed material configured such that particles composed of a metal material, a semiconductor material, or a dielectric material are dispersed in a dielectric matrix. In the case where particles are orderly dispersed in a dielectric matrix, it is preferable to coincide the recording position at which the optical loss is minimized, and the position of each respective recording region 22 of the recording layer 2 with each other.

The embodiment is also applicable to a configuration of reproducing information by detecting reflected light from the recording layer 2 on which information has been recorded. The above configuration makes it possible to minimize variation of reflected light in a recording state, in the case where the structure period of the left-handed material layer 1 and the arrangement period of the recording regions 22 of the recording layer 2 coincide with each other.

In this embodiment, near-field light is used as recording light. However, the invention is not limited to the above. Specifically, it is possible to use, as recording light, an electromagnetic wave including an electric wave, a radio wave, a microwave, a terahertz wave, an infrared ray, an ultraviolet ray, an X-ray, and a γ-ray. As described above, various modifications are applicable, as far as such modifications do not depart from the gist of the invention.

The recording regions 22 are not limited to particles. For instance, the recording regions 22 may be columnar-shaped structures or hemispherical-shaped structures. As far as the structures protrude, any shape may be used.

Further, preferably, the structure period of the left-handed material layer 1 is equal to n times (where n is a positive integer of 2 or larger) of the arrangement period of the recording regions 22 of the recording layer 2. The above configuration is advantageous in increasing the light amplifying effect by the left-handed material layer 1.

As described above, in the first to third embodiments, the left-handed material layer 1 is formed on the light irradiation side of the recording layer 2.

In the above configuration, light irradiated from the outside is irradiated onto the recording layer 2 via the left-handed material layer 1. At the time of light irradiation, light is collected with use of the left-handed material layer 1. Accordingly, it is possible to collect light of a very small size of not larger than the diffraction limit of light onto the recording layer 2. In particular, it is possible to amplify the intensity of light wave having a large wavenumber such as evanescent wave or near-field light by the left-handed material layer 1. Further, as described above, the structure period of the left-handed material layer 1 is equal to or is an integral multiple of the arrangement period of the recording regions 22 of the recording layer 2. Accordingly, it is possible to make the light amplifying effect uniform.

In the recording media of the first to third embodiments, the left-handed material layer may be formed on the side of the recording layer opposite to the light irradiation side. The recording medium in the above modification is described referring to FIG. 12 and FIG. 13.

Figure 12:
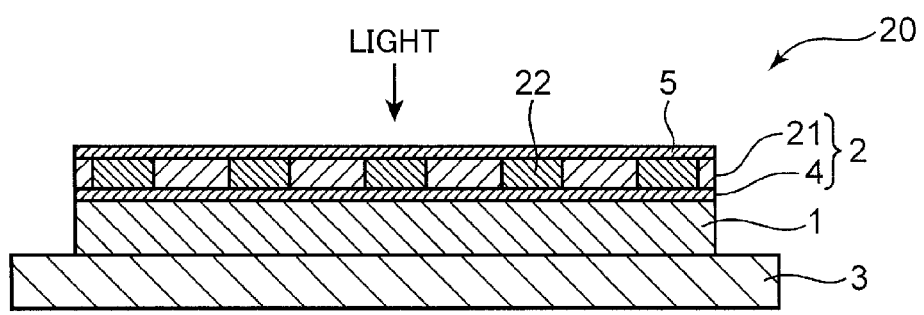
FIG. 12 is a diagram showing a configuration of a recording medium configured such that one left-handed material layer and one recording layer are laminated.
Figure 13:
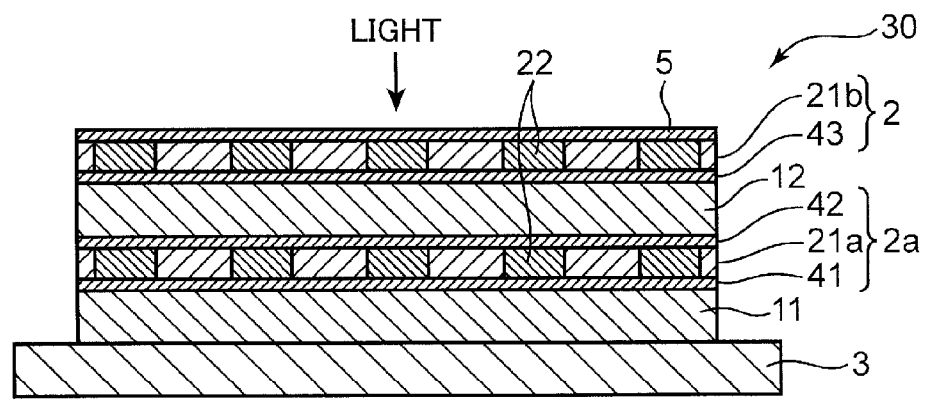
FIG. 13 is a diagram showing a configuration of a recording medium configured such that left-handed material layers and recording layers are sequentially laminated.

FIG. 12 is a diagram showing a configuration of a recording medium, in which one left-handed material layer and one recording layer are laminated. FIG. 13 is a diagram showing a configuration of a recording medium, in which left-handed material layers and recording layers are sequentially laminated.

A recording medium 20 shown in FIG. 12 is provided with a left-handed material layer 1, a recording layer 2, a substrate 3, and a protection layer 5. The left-handed material layer 1 is formed on the substrate 3. The recording layer 2 is formed on the left-handed material layer 1. The recording layer 2 is provided with a phase-change recording layer 21 and an interface layer 4. The phase-change recording layer 21 includes island-shaped and substantially periodically arranged recording regions 22. The protection layer 5 is formed on the recording layer 2.

Further, a recording medium 30 shown in FIG. 13 is provided with a first left-handed material layer 11, a first recording layer 2a, a second left-handed material layer 12, a second recording layer 2b, a substrate 3, and a protection layer 5. The first left-handed material layer 11 is formed on the substrate 3. The first recording layer 2a is formed on the first left-handed material layer 11. The first recording layer 2a is provided with a first phase-change recording layer 21a, a first interface layer 41, and a second interface layer 42. The second left-handed material layer 12 is formed on the first recording layer 2a. The second recording layer 2b is formed on the second left-handed material layer 12. The second recording layer 2b is provided with a second phase-change recording layer 21b and a third interface layer 43. The first phase-change recording layer 21a and the second phase-change recording layer 21b include island-shaped and substantially periodically arranged recording regions 22. The protection layer 5 is formed on the second recording layer 2b.

In the above configurations, if the symbol of the real number part of the permittivity of the left-handed material layer, which is formed on the deeper side than the recording layer, is minus, it is possible to amplify the light intensity. For instance, in the case where near-field light is generated by a near-field light generating element (e.g. a metal antenna), and information is recorded on a recording region of the recording layer by the generated near-field light, it is possible to enhance the near-field light from the near-field light generating element, because interaction between the near-field light generating element and the left-handed material layer makes it possible to increase the intensity of plasmon resonance. Further, it is possible to increase the recording sensitivity with respect to each respective recording region of the recording layer, which is formed between the near-field light generating element and the left-handed material layer. Further, as described above, the structure period of the left-handed material layer is equal to or is an integral multiple of the arrangement period of the recording layer. Accordingly, it is possible to make the plasmon resonance enhancement effect uniform.

In the following, a recording apparatus for recording information on one of the recording media of the first to third embodiments is described. The recording apparatus is provided with a light emitting element which emits light for recording information on a recording medium.

Figure 14:
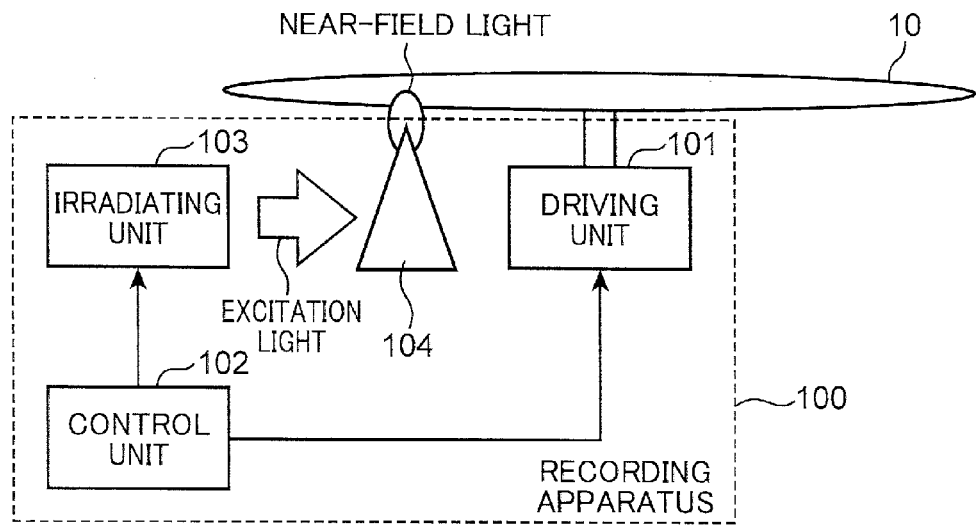
FIG. 14 is a diagram showing a configuration of a recording apparatus in the embodiments.

FIG. 14 is a diagram showing a configuration of the recording apparatus in the embodiments.

The recording apparatus 100 is provided with a driving unit 101, a control unit (information processing unit) 102, an irradiating unit 103, and a light emitting element 104. The recording medium 10 is one of the recording media described in the first to third embodiment.

The driving unit 101 rotates the recording medium 10. The driving unit 101 may be constituted of a motor, for instance.

The control unit 102 generates a signal for generating intended near-field light from the light emitting element 104, and transmits the generated signal to the irradiating unit 103. For instance, the control unit 102 may set the power of excitation light to be emitted from the irradiating unit 103, based on recording data to be recorded on the recording medium 10. The control unit 102 processes the information to be recorded on the recording medium 10. Further, the control unit 102 controls the rotating operation of the driving unit 101.

The irradiating unit 103 emits excitation light according to a signal from the control unit 102, and irradiates the light emitting element 104.

The light emitting element 104 generates near-field light using plasmon resonance according to the irradiated excitation light. The near-field light is irradiated on a recording region 22 (e.g. a particle) on the recording medium 10. The light emitting element 104 may be a near-field light generating element (e.g. a metal antenna), for instance.

Upon irradiation of near-field light, the recording region 22 is heated. In the case where the recording region 22 contains a phase-change material, the optical characteristics of the recording region 22 changes by heating. For instance, the recording region 22 changes from a crystalline state to an amorphous state, or changes from an amorphous state to a crystalline state. It is possible to record information on the recording region 22 by utilizing the change in the recording state.

Also, in the recording apparatus utilizing plasmon resonance as described above, it is possible to make the light amplifying effect uniform and to make the plasmon resonance enhancement effect uniform by setting the structure period of the left-handed material layer equal to or to an integral multiple of the arrangement period of the recording regions of the recording layer. The above configuration makes it possible to implement stable information recording, while suppressing variation of recording characteristics.

The recording apparatus 100 of the embodiment may be provided with a magnetic recording unit for magnetically recording information. In the above modification, the recording medium 10 may include recording regions containing a magnetic recording material. In the above modification, when near-field light is irradiated from the light emitting element 104 and a recording region is heated, a magnetic holding force of the recording region is temporarily lowered. It is possible to magnetically record information on the recording region in which the magnetic holding force is lowered by the magnetic recording unit, with use of the above phenomenon.

Also, in the case of a magnetic recording system as described above, it is possible to make the light amplifying effect uniform and to make the plasmon resonance enhancement effect uniform by setting the structure period of the left-handed material layer equal to or to an integral multiple of the arrangement period of the recording regions of the recording layer. Further, it is possible to uniformly lower the magnetic holding force of the recording regions. In other words, it is possible to keep the uniformity of recording characteristics in a satisfactory manner.

In the following, a reproducing apparatus for reproducing information from one of the recording media of the first to third embodiments is described. The reproducing apparatus is provided with a light emitting element which emits light for reproducing information from a recording medium.

Figure 15:
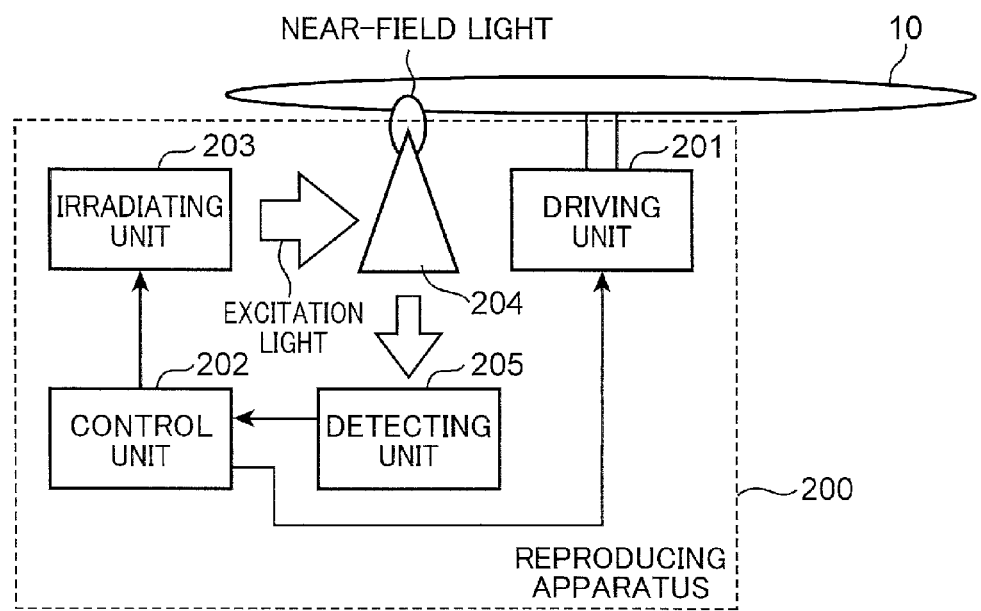
FIG. 15 is a diagram showing a configuration of a reproducing apparatus in the embodiments.

FIG. 15 is a diagram showing a configuration of a reproducing apparatus in the embodiments.

A reproducing apparatus 200 is provided with a driving unit 201, a control unit (information processing unit) 202, an irradiating unit 203, a light emitting element 204, and a detecting unit 205. The recording medium 10 is one of the recording media described in the first to third embodiments.

The driving unit 201 rotates the recording medium 10. The driving unit 201 may be constituted of a motor, for instance.

The control unit 202 generates a signal for generating intended near-field light from the light emitting element 204, and transmits the generated signal to the irradiating unit 203. For instance, the control unit 202 may set the power of excitation light for reproduction to be emitted from the irradiating unit 203. Further, the control unit 202 controls the rotating operation of the driving unit 201.

The irradiating unit 203 emits excitation light according to a signal from the control unit 202, and irradiates the light emitting element 204.

The light emitting element 204 generates near-field light using plasmon resonance according to the irradiated excitation light. The near-field light is irradiated on a recording region 22 (e.g. a particle) on the recording medium 10. The light emitting element 204 may be a near-field light generating element (e.g. a metal antenna), for instance.

The detecting unit 205 detects a change in the resonance state of the light emitting element 204 according to a recording state of the recording region 22. For instance, the detecting unit 205 detects a change in the resonance state of the light emitting element 204 by detecting a change in the reflected light from the light emitting element 204 or a change in the transmitted light through the light emitting element 204. The detecting unit 205 outputs, to the control unit 202, a detection signal indicating the detected change in the resonance state. The control unit 202 processes the information reproduced from the recording medium 10, based on the detection signal from the detecting unit 205.

In the case where the recording region 22 contains a phase-change material, the degree of resonance between the recording region 22 and the light emitting element 204 differs depending on whether the recording region 22 is in a crystalline state or in an amorphous state. Further, reflected light from the light emitting element 204, or transmitted light through the light emitting element 204 changes depending on a resonance state of the light emitting element 204. Accordingly, the detecting unit 205 is capable of detecting whether the recording region 22 is in a crystalline state or in an amorphous state by irradiating light onto the light emitting element 204, and by detecting a change in the reflected light from the light emitting element 204 or a change in the transmitted light through the light emitting element 204. In this way, the reproducing apparatus 200 reproduces information from the recording medium 10.

In the reproducing apparatus utilizing plasmon resonance as described above, it is also possible to make the light amplifying effect uniform and to make the plasmon resonance enhancement effect uniform by setting the structure period of the left-handed material layer equal to or to an integral multiple of the arrangement period of the recording regions of the recording layer. The above configuration makes it possible to implement stable information reproduction, while suppressing variation of reproducing characteristics.

In the following, a method for producing the recording medium embodying the invention is described.

The recording medium producing method of the embodiment includes a step of laminating a left-handed material layer having at least one of a permittivity and a permeability of a negative value, and having substantially periodically formed structures; and a recording layer including island-shaped and substantially periodically arranged recording regions. In the above configuration, the structure period of the left-handed material layer is equal to or is an integral multiple of the arrangement period of the recording regions of the recording layer.

According to the above configuration, it is possible to produce a recording medium, in which the recording characteristics with respect to a recording layer using a left-handed material are uniform.

Further, in the recording medium producing method of the embodiment, the left-handed material layer may be formed on the side of the recording layer opposite to the side thereof, on which light for recording or reproducing is irradiated.

For instance, the recording medium producing method may include a step of forming a recording layer including island-shaped and substantially periodically arranged recording regions, and a step of forming a left-handed material layer having at least one of a permittivity and a permeability of a negative value, and having substantially periodically formed structures.

Further, in the recording medium producing method of the embodiment, the left-handed material may be formed on the side of the recording layer, on which light for recording or reproducing is irradiated.

For instance, the recording medium producing method may include a step of forming a left-handed material layer having at least one of a permittivity and a permeability of a negative value, and having substantially periodically formed structures; and a step of forming a recording layer including island-shaped and substantially periodically arranged recording regions.

In the case where a recording layer and a left-handed material layer are formed on a disc-shaped recording medium, it is necessary to arrange the recording regions of the recording layer and the structures of the left-handed material layer with a layout capable of performing a recording operation and a reproducing operation.

Figure 16:
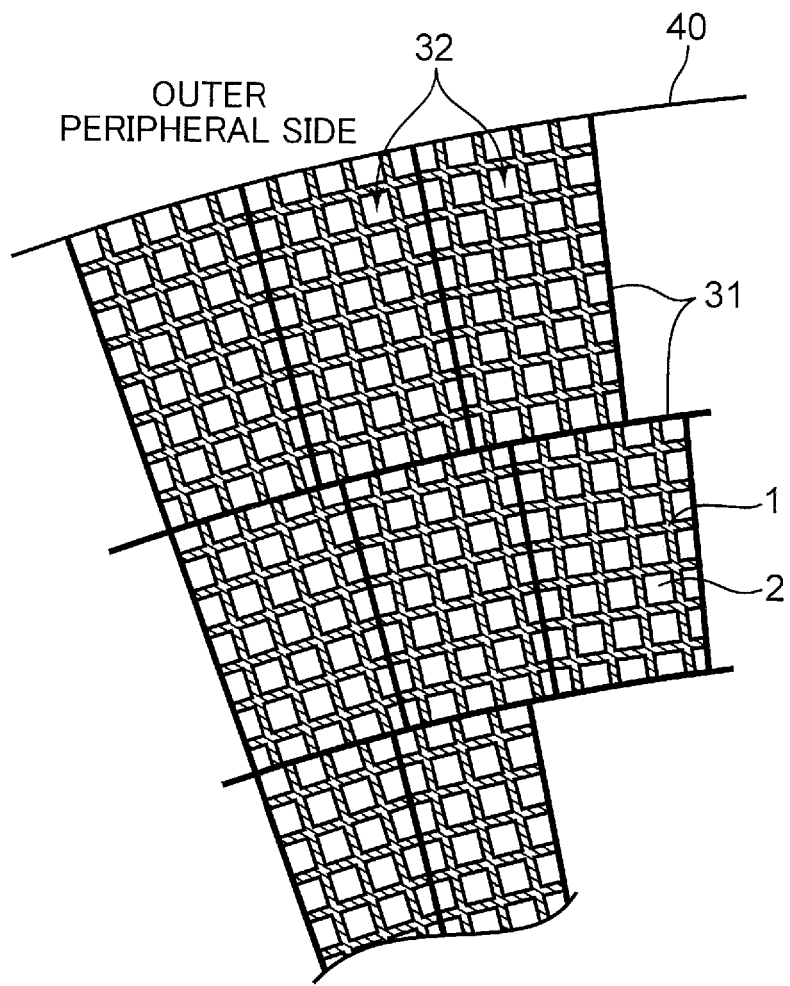
FIG. 16 is a diagram for describing a method for arranging a recording layer and a left-handed material layer on a disc-shaped recording medium.
Figure 16:
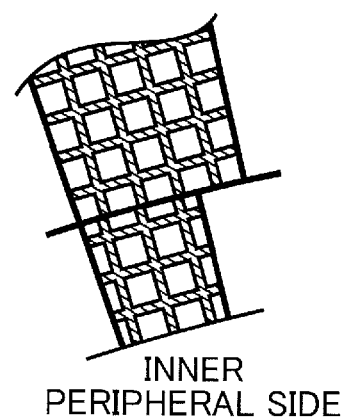

FIG. 16 is a diagram for describing a method for arranging a recording layer and a left-handed material layer on a disc-shaped recording medium.

As shown in FIG. 16, a recording medium 40 is provided with a guide groove 31 for dividing the recording surface of the recording medium 40 into a number of regions 32; a left-handed material layer 1 having at least one of a permittivity and a permeability of a negative value, and having substantially periodically formed structures; and a recording layer 2 including island-shaped and substantially periodically arranged recording regions and being laminated on the left-handed material layer 1.

The guide groove 31 includes a number of guide groove segments each formed in a radial direction of the recording medium 40, and a number of guide groove segments each formed in a circumferential direction of the recording medium 40. The structure period of the left-handed material layer 1 is equal to or is an integral multiple of the arrangement period of the recording regions of the recording layer 2 with respect to each of the regions 32 divided by the guide groove 31.

As a method for arranging the substantially periodically formed recording layer 2 and the left-handed material layer 1 on intended regions 32 of the disc-shaped recording medium 40, as shown in FIG. 16, the recording surface of the recording medium is divided into a number of regions 32 by an intended physical guide groove 31 in advance, and then, the substantially periodical recording layer 2 and the structures of the left-handed material layer 1 are formed within the regions 32 surrounded by the guide groove 31. In the above configuration, it is not necessary to coincide the arrangement period of the recording regions of the recording layer 2, and the structure period of the left-handed material layer 1 with each other in a boundary portion of the guide groove 31.

The foregoing embodiments mainly include the invention having the following configurations.

An optical recording medium according to an aspect of the invention is provided with a left-handed material layer having at least one of a permittivity and a permeability of a negative value, and having substantially periodically formed structures; and a recording layer including island-shaped and substantially periodically arranged recording regions, and being laminated on the left-handed material layer, wherein a structure period of the left-handed material layer is equal to or is an integral multiple of an arrangement period of the recording regions of the recording layer.

According to the above configuration, the left-handed material layer has at least one of a permittivity and a permeability of a negative value, and has substantially periodically formed structures. The recording layer includes island-shaped and substantially periodically arranged recording regions, and is laminated on the left-handed material layer. The structure period of the left-handed material layer is equal to or is an integral multiple of the arrangement period of the recording regions of the recording layer.

As described above, the structure period of the left-handed material layer is equal to or is an integral multiple of the arrangement period of the recording regions of the recording layer. Accordingly, it is possible to make the recording intensity uniform, and to implement stable information recording or reproduction, while suppressing variation of reflected light in a recording state.

Further, in the optical recording medium, preferably, the structure period of the left-handed material layer may be equal to n times (where n is a positive integer of 2 or larger) of the arrangement period of the recording regions of the recording layer.

According to the above configuration, it is possible to increase the light amplifying effect of the left-handed material layer.

Further, in the optical recording medium, preferably, the permittivity of the left-handed material layer may have a negative value, light may be irradiated onto the recording medium, and the left-handed material layer may be formed on a side of the recording layer opposite to a side thereof, on which the light is irradiated.

According to the above configuration, the permittivity of the left-handed material layer has a negative value. Light is irradiated onto the recording medium. The left-handed material layer is formed on a side of the recording layer opposite to a side thereof, on which the light is irradiated.

Accordingly, as far as the permittivity of the left-handed material layer, which is formed on the deeper side than the recording layer, has a negative value, it is possible to amplify the light intensity. For instance, in the case where near-field light is generated by a near-field light generating element, and information is recorded on each respective recording region of the recording layer by the generated near-field light, it is possible to enhance the near-field light from the near-field light generating element, because interaction between the near-field light generating element and the left-handed material layer makes it possible to increase the intensity of plasmon resonance. Further, it is possible to increase the recording sensitivity with respect to each respective recording region of the recording layer, which is formed between the near-field light generating element and the left-handed material layer. Further, as described above, the structure period of the left-handed material layer is equal to or is an integral multiple of the arrangement period of the recording layer. Accordingly, it is possible to make the plasmon resonance enhancement effect uniform.

Further, in the optical recording medium, preferably, light may be irradiated onto the recording medium, and the left-handed material layer may be formed on a side of the recording layer, on which the light is irradiated.

According to the above configuration, light is irradiated onto the recording medium. The left-handed material layer is formed on a side of the recording layer, on which the light is irradiated.

Since light is collected on the recording layer by the left-handed material layer, it is possible to collect light of a very small size of not larger than the diffraction limit of light on the recording layer. In particular, it is possible to amplify the intensity of light wave having a large wavenumber such as evanescent wave or near-field light by the left-handed material layer. Further, as described above, the structure period of the left-handed material layer is equal to or is an integral multiple of the arrangement period of the recording regions of the recording layer. Accordingly, it is possible to make the light amplifying effect uniform.

Further, in the optical recording medium, preferably, the recording layer may include a phase-change recording layer made of a phase-change material containing at least one of Ge, Sb, and Te; and an interface layer made of a material containing at least one of Si, Zr, Cr, and N, the interface layer being formed on at least one surface of the phase-change recording layer.

According to the above configuration, it is possible to stably record information on each respective recording region by protecting the recording layer by the interface layer.

Further, in the optical recording medium, preferably, the left-handed material layer may have a principal plane to be contacted with the recording layer, and the left-handed material layer may have a negative permittivity at least in one of a direction of light to be perpendicularly incident on the principal plane of the left-handed material layer, and a direction of light to be obliquely incident on the principal plane.

According to the above configuration, the left-handed material layer has a principal plane to be contacted with the recording layer. The left-handed material layer has a negative permittivity at least in one of a direction of light to be perpendicularly incident on the principal plane of the left-handed material layer, and a direction of light to be obliquely incident on the principal plane.

Accordingly, it is possible to amplify the light intensity at least in one of the direction of light to be perpendicularly incident on the principal plane of the left-handed material layer, and the direction of light to be obliquely incident on the principal plane.

Further, in the optical recording medium, preferably, the left-handed material layer may have a negative refractive index at least in one of the direction of light to be perpendicularly incident on the principal plane of the left-handed material layer, and the direction of light to be obliquely incident on the principal plane.

According to the above configuration, the left-handed material layer has a negative refractive index at least in one of the direction of light to be perpendicularly incident on the principal plane of the left-handed material layer, and the direction of light to be obliquely incident on the principal plane.

Accordingly, it is possible to collect, on the recording layer, at least one of the light to be perpendicularly incident on the principal plane of the left-handed material layer, and the light to be obliquely incident on the principal plane.

Further, in the optical recording medium, preferably, a thickness of the left-handed material layer may be in a range of from 20 nm to 200 nm.

According to the above configuration, the thickness of the left-handed material layer is in the range of from 20 nm to 200 nm. Accordingly, it is possible to suppress the optical loss by the left-handed material layer.

An optical information device according to another aspect of the invention is an optical information device for recording information on the recording medium having one of the above configurations, or for reproducing information from the recording medium having one of the above configurations. The optical information device is provided with a light emitting element which emits light for recording information on the recording medium, or for reproducing information from the recording medium; and an information processing unit which processes the information to be recorded on the recording medium, or the information reproduced from the recording medium.

According to the above configuration, the light emitting element emits light for recording information on the recording medium, or for reproducing information from the recording medium. The information processing unit processes the information to be recorded on the recording medium, or the information reproduced from the recording medium. The optical recording medium is provided with a left-handed material layer having at least one of a permittivity and a permeability of a negative value, and having substantially periodically formed structures; and a recording layer including island-shaped and substantially periodically arranged recording regions, and being laminated on the left-handed material layer. The structure period of the left-handed material layer is equal to or is an integral multiple of the arrangement period of the recording regions of the recording layer.

As described above, the structure period of the left-handed material layer is equal to or is an integral multiple of the arrangement period of the recording regions of the recording layer. Accordingly, it is possible to make the recording intensity uniform, and to implement stable information recording or reproduction, while suppressing variation of reflected light in a recording state.

A method for producing a recording medium according to yet another aspect of the invention includes a step of laminating a left-handed material layer having at least one of a permittivity and a permeability of a negative value, and having substantially periodically formed structures, and a recording layer including island-shaped and substantially periodically arranged recording regions, wherein a structure period of the left-handed material layer is equal to or is an integral multiple of an arrangement period of the recording regions of the recording layer.

According to the above configuration, the left-handed material layer has at least one of a permittivity and a permeability of a negative value, and has substantially periodically formed structures. The recording layer includes island-shaped and substantially periodically arranged recording regions, and is laminated on the left-handed material layer. The structure period of the left-handed material layer is equal to or is an integral multiple of the arrangement period of the recording regions of the recording layer.

As described above, the structure period of the left-handed material layer is equal to or is an integral multiple of the arrangement period of the recording regions of the recording layer. Accordingly, it is possible to make the recording intensity uniform, and to implement stable information recording or reproduction, while suppressing variation of reflected light in a recording state.

The embodiments or the examples described in the detailed description of the invention are provided to clarify the technical contents of the invention. The invention should not be construed to be limited to the embodiments or the examples. The invention may be modified in various ways as far as such modifications do not depart from the spirit and the scope of the invention hereinafter defined.

INDUSTRIAL APPLICABILITY

The recording medium, the optical information device, and the method for producing the recording medium of the invention can implement stable information recording or reproduction, and are useful as a recording medium, an optical information device, and a method for producing the recording medium utilizing a left-handed material.

The invention claimed is:

1. A recording medium, comprising:
a left-handed material layer having at least one of a permittivity and a permeability of a negative value, and having substantially periodically formed structures; and
a recording layer including island-shaped and substantially periodically arranged recording regions, and being laminated on the left-handed material layer, wherein
a structure period of the left-handed material layer is equal to or is an integral multiple of an arrangement period of the recording regions of the recording layer.

2. The recording medium according to claim 1, wherein the structure period of the left-handed material layer is equal to n times (where n is a positive integer of 2 or larger) of the arrangement period of the recording regions of the recording layer.

3. The recording medium according to claim 1, wherein the permittivity of the left-handed material layer has a negative value,
light is irradiated onto the recording medium, and
the left-handed material layer is formed on a side of the recording layer opposite to a side thereof, on which the light is irradiated.

4. The recording medium according to claim 1, wherein light is irradiated onto the recording medium, and
the left-handed material layer is formed on a side of the recording layer, on which the light is irradiated.

5. The recording medium according to claim 1, wherein the recording layer includes:
a phase-change recording layer made of a phase-change material containing at least one of Ge, Sb, and Te; and
an interface layer made of a material containing at least one of Si, Zr, Cr, and N, the interface layer being formed on at least one surface of the phase-change recording layer.

6. The recording medium according to claim 1, wherein the left-handed material layer has a principal plane to be contacted with the recording layer, and
the left-handed material layer has a negative permittivity at least in one of a direction of light to be perpendicularly incident on the principal plane of the left-handed material layer, and a direction of light to be obliquely incident on the principal plane.

7. The recording medium according to claim 6, wherein the left-handed material layer has a negative refractive index at least in one of the direction of light to be perpendicularly incident on the principal plane of the left-handed material layer, and the direction of light to be obliquely incident on the principal plane.

8. The recording medium according to claim 1, wherein a thickness of the left-handed material layer is in a range of from 20 nm to 200 nm.

9. An optical information device for recording information on a recording medium, or for reproducing information from the recording medium, comprising:
a light emitting element which emits light for recording information on the recording medium, or for reproducing information from the recording medium; and
an information processing unit which processes the information to be recorded on the recording medium, or the information reproduced from the recording medium,
the recording medium comprising:
a left-handed material layer having at least one of a permittivity and a permeability of a negative value, and having substantially periodically formed structures; and
a recording layer including island-shaped and substantially periodically arranged recording regions, and being laminated on the left-handed material layer,
wherein a structure period of the left-handed material layer is equal to or is an integral multiple of an arrangement period of the recording regions of the recording layer.

10. A method for producing a recording medium, comprising:
a step of laminating a left-handed material layer having at least one of a permittivity and a permeability of a negative value, and having substantially periodically formed structures, and a recording layer including island-shaped and substantially periodically arranged recording regions, wherein
a structure period of the left-handed material layer is equal to or is an integral multiple of an arrangement period of the recording regions of the recording layer.

* * * * *